(12) United States Patent
Ishiwata et al.

(10) Patent No.: US 6,651,429 B2
(45) Date of Patent: Nov. 25, 2003

(54) MASTER CYLINDER

(75) Inventors: Ichiro Ishiwata, Yokosuka (JP); Kazuhisa Taira, Yokosuka (JP); Fujio Miyamoto, Yokosuka (JP); Yukihiro Honda, Yokosuka (JP)

(73) Assignee: Bosch Braking Systems Co., Ltd., Tokyo (JP)

( * ) Notice: Subject to any disclaimer, the term of this patent is extended or adjusted under 35 U.S.C. 154(b) by 0 days.

(21) Appl. No.: 09/928,322

(22) Filed: Aug. 13, 2001

(65) Prior Publication Data
US 2002/0124562 A1 Sep. 12, 2002

(30) Foreign Application Priority Data

Aug. 14, 2000 (JP) ........................ 2000-245563
Mar. 30, 2001 (JP) ........................ 2001-099789

(51) Int. Cl.[7] ........................... B60T 11/228; F15B 7/08
(52) U.S. Cl. ........................................ 60/588
(58) Field of Search ................................ 60/588

(56) References Cited

U.S. PATENT DOCUMENTS

| | | | | |
|---|---|---|---|---|
| 2,118,604 A | * | 5/1938 | Heidloff | 60/588 |
| 2,208,575 A | * | 7/1940 | Frank | 60/588 |
| 2,349,346 A | | 5/1944 | Goepfrich | |
| 3,940,938 A | | 3/1976 | Durham et al. | 60/588 |
| 3,980,004 A | * | 9/1976 | Jones et al. | 60/588 |
| 4,209,285 A | | 6/1980 | Jasinski et al. | |
| 4,744,219 A | * | 5/1988 | Yamamoto et al. | 60/588 |

FOREIGN PATENT DOCUMENTS

| | | |
|---|---|---|
| GB | 2355504 | 4/2001 |
| JP | 42873 | 4/1976 |

* cited by examiner

Primary Examiner—F. Daniel Lopez
(74) Attorney, Agent, or Firm—Carothers & Carothers (57) ABSTRACT

A master cylinder including a cylinder body having a cylindrical bore and an opening in the circumferential wall for a relief port communicating with the interior of hydraulic reservoir. A piston is slidably inserted into the cylindrical bore to form a hydraulic pressure generating chamber in the cylindrical bore. A cup seal is provided with an inner circumferential lip portion contacting with the piston, an outer circumferential lip portion slidably contacting with the inner circumferential wall of the cylindrical bore, and a base portion connecting the lip portions, which are so arranged as to face to the hydraulic pressure generating chamber. The cup seal cuts the communication between the hydraulic pressure generating chamber and the hydraulic reservoir through the relief port when the top end of the outer circumferential lip portion passes by the relief port. The improvement resides in means provided for rotating the cup seal relative to the cylindrical bore with movement of the piston at portions of the cup seal except those portions facing to the inner wall of the cylindrical bore.

12 Claims, 8 Drawing Sheets

MASTER CYLINDER

BACKGROUND OF THE INVENTION

1. Field of the Invention

This invention relates to a master cylinder, and more particularly to a master cylinder of the conventional type, preferable for a brake system with an anti-skid fluid pressure control apparatus which includes a hydraulic pressure pump to pressurize the brake fluid discharged from the wheel cylinder and to return it into the master cylinder.

2. Description of the Prior Art

As the prior art of the conventional type, there is known a master cylinder including: (a) a cylinder body having a cylindrical bore and an opening made in the circumferential wall, for a relief port communicating with the interior of a hydraulic reservoir; (b) a piston inserted slidably into the cylindrical bore to form a hydraulic pressure generating chamber in the cylindrical bore; and (c) a cup seal having an inner circumferential lip portion contacting with the piston, an outer circumferential lip portion slidably contacting with the inner circumferential wall of the cylindrical bore, and a base portion connecting the lip portions which are so arranged as to face to the hydraulic pressure generating chamber, whereby the cup seal cuts the communication between the hydraulic pressure generating chamber and the hydraulic reservoir through the relief port when the top end of the outer circumferential lip portions passes by the relief port. (For example, it is disclosed in the Japanese Utility Model Registration Official Opening Gazette No. 32127/1987 and No. 8931/1996.)

Although the master cylinder of the conventional type is simple in construction, in comparison with a master cylinder of the center-valve type, it has the disadvantage that the cup seal is susceptible to damage.

In the operation of the master cylinder of the conventional type, the outer circumferential lip portion of the cup seal or the circumferential portion of the base portion of the cup seal is subject to a high pressure from the hydraulic pressure generating chamber at the position of the opening of the relief port. The phenomenon is proved that the circumferential portion of the cup seal is pushed locally into the opening of the relief port. When this phenomenon is repeated at the same position of the circumferential portion of the cup seal, that part of the cup seal is subject to such damage as to appear to be bitten. Large damage leads to seal deterioration.

The occurrence of the above described damage of the cup seal is remarkable in a brake system with an anti-skid brake fluid control apparatus (ABS-Anti-lock Braking Systems, disclosed, for example in the Japanese opening gazette No. 150915/1996) which includes a fluid pressure pump to pressurize brake fluid discharged from the wheel cylinder and to return it into the master cylinder, and in which high pulsating pressure is applied to the cup seal. Irrespective of the ABS, when the master cylinder is panicly or rapidly operated to steeply raise the fluid pressure of the fluid pressure generating chamber, the above phenomenon becomes remarkable.

On the other hand, Japanese Patent Official Gazette No. 42873/1976 disclosed the master cylinder wherein the cup seal is rotated relative to the inner wall of the cylindrical bore so as to not push the same part of the outer circumferential surface of the cup seal into the opening of the relief port, and wherein slant grooves are formed in the outer circumferential surface of the cup seal.

However, in the above master cylinder, a portion of the slant groove is apt to engage with the opening of the relief port. When a high pressure is applied to the engaged part of the cup seal from the fluid pressure generating chamber, there occurs a large pressure difference between the outside and inside of the engaged groove and so that portion is so deformed as to appear to be bitten by the opening of the relief port. Thus, it was proved that the outer circumferential part of the cup seal is apt to be damaged.

SUMMARY OF THE INVENTION

Accordingly, it is an object of this invention to provide a master cylinder in which a cup seal can be effectively prevented from being submitted to local or concentric damage.

Another object of this invention is to provide a master cylinder which is durable and has long life.

In accordance with an aspect of this invention, a master cylinder includes:

(a) a cylinder body having a cylindrical bore and an opening made in the circumferential wall of the body for a relief port communicating with the interior of hydraulic reservoir;

(b) a piston slidably inserted into said cylindrical bore to form a hydraulic pressure generating chamber in said cylindrical bore; and (c) a cup seal having an inner circumferential lip portion contacting with said piston, an outer circumferential lip portion slidably contacting with the inner circumferential wall of said cylindrical bore, and a base portion connecting said lip portions, which lip portions are so arranged as to face to said hydraulic pressure generating chamber, whereby said cup seal cuts the communication between said hydraulic pressure generating chamber and said hydraulic reservoir though said relief port when the top end of said outer circumferential lip portions passes by said relief port, the improvement including means for rotating said cup seal relative to said cylindrical bore with the movement of said piston is provided at portions thereof other than portions of said cup seal facing to the inner wall of said cylindrical bore.

In accordance with another aspect of this invention, the master cylinder includes:

(a) a cylinder body having a cylindrical bore and an opening made in the circumferential wall, of the body for a relief port communicating with the interior of hydraulic reservoir;

(b) a piston slidably inserted into said cylindrical bore to form a hydraulic pressure generating chamber in said cylindrical bore; and (c) a cup seal having a base portion supported at the back by a flange portion of said piston, and an outer circumferential lip portion extending towards said hydraulic pressure generating chamber from the front side of said base portion, and contacting with the inner wall of the cylindrical bore whereby said cup seal cuts the communication between said hydraulic pressure generating chamber and said hydraulic reservoir through said relief port when the top ends of said lip portions pass by said relief port, the improvement including the inner diameter of said base portion is so large that a gap is formed between the inner circumferential surface of said base portion and the outer circumferential surface of the axial portion of said piston fitting to said base portion, and means for inducing rotational force to said cup seal relative to the inner wall of said cylindrical bore with the relief of the fluid pressure of the fluid pressure generating chamber or reducing the contact pressure on said piston and thereby cause said cup seal to rotate, and said means is provided on said cup seal in portions thereof other than the outer circumferential surface of said base portion and outer lip portion.

DESCRIPTION OF THE PREFERRED EMBODIMENTS

Figure 1:
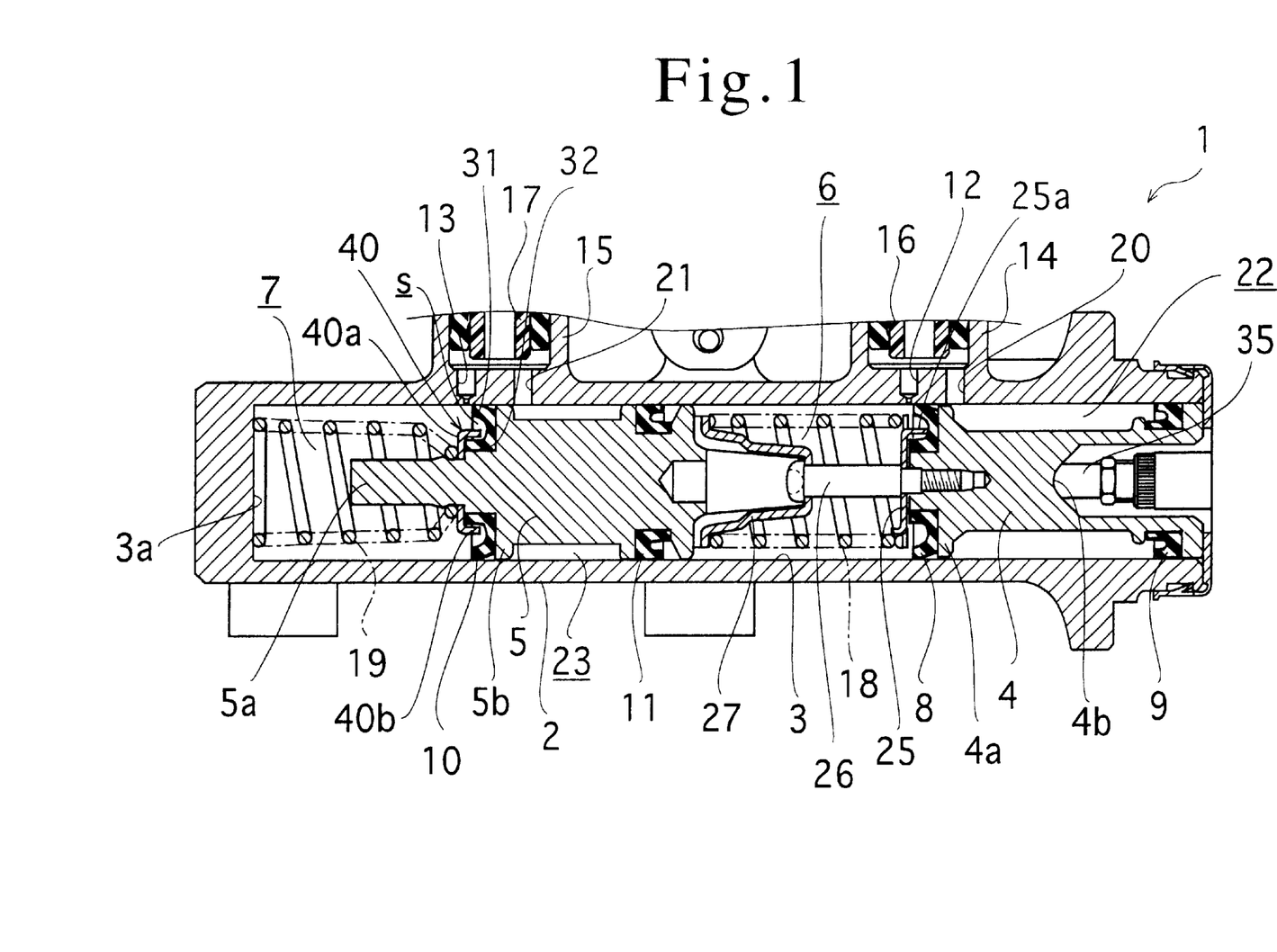
FIG. 1 is a cross-sectional view of a master cylinder according to a first embodiment of this invention.

FIG. 1 shows a maser cylinder according to a first embodiment of this invention. In a master cylinder 1 of this embodiment, a primary piston 4 and a secondary piston 5 which are herein-after simply called "piston", are slidably inserted into a cylindrical bore 3 of a cylinder body 2. Two fluid pressure generating chambers <u>6</u> and <u>7</u> are formed by the pistons 4 and 5, and the cylindrical body 2, and they are connected to not-shown wheel cylinders, to apply brake fluid pressure thereto. Thus, a tandem master cylinder is constructed.

Rubber annular cup seals 8, 9, 10, and 11 are fitted to the reduced circumferential portions of the pistons 4 and 5, respectively. One <u>6</u> of the fluid pressure generating chambers 6 and 7 is formed between the two pistons 4 and 5. The other <u>7</u> of the fluid pressure generating chambers 6 and 7 is formed between the piston 5 and the closed end of the cylindrical bore 3.

The cup seal 8 divides the cylindrical bore 3 into the fluid pressure generating chamber <u>6</u> and fluid supply or compensating chamber <u>22</u>, and is positioned by a flange portion 4*a* of the piston 4 and an engaging member 25 supporting one end of a coil spring 18. Another end of the coil spring 18 is supported by a retainer 27 engaged with a head of a bolt member 26 which is combined with the piston 4. The coil spring 18 urges the piston 4 rightwards into the shown inoperative position of the master cylinder. The fluid pressure chamber 6 communicates through a relief port 12 with the interior of a hydraulic reservoir.

Next, there will be described a cup seal 10 of the secondary side for dividing the cylindrical bore 3 into the fluid pressure generating chamber <u>7</u> and a fluid supplying or compensating chamber <u>23</u> with reference to FIG. 2 which shows an enlarged view of an important part of FIG. 1.

The cup seal 10 consists of an outer circumferential lip portion 31 and an inner circumferential lip portion 32, both extending toward the fluid pressure generating chamber 7 and a base portion 30 connecting the outer and inner circumferential lip portions 31 and 32.

One end of the outer circumferential lip portion 31 elastically contacts with the inner surface of the cylindrical bore 3. The inner circumferential lip portion 32 and the base portion 30 elastically contact with an axial portion 5*a* of the piston 5. The back side of the base portion 30 contacts with the flange portion 5*b* of the piston 5. The cup seal 8 of the primary side is similar to the cup seal 10 in construction.

An engaging member 40 is fitted to the axial portion 5*a* of the piston 5 for preventing the cup seal 10 from falling off from the piston 5.

Figure 3:
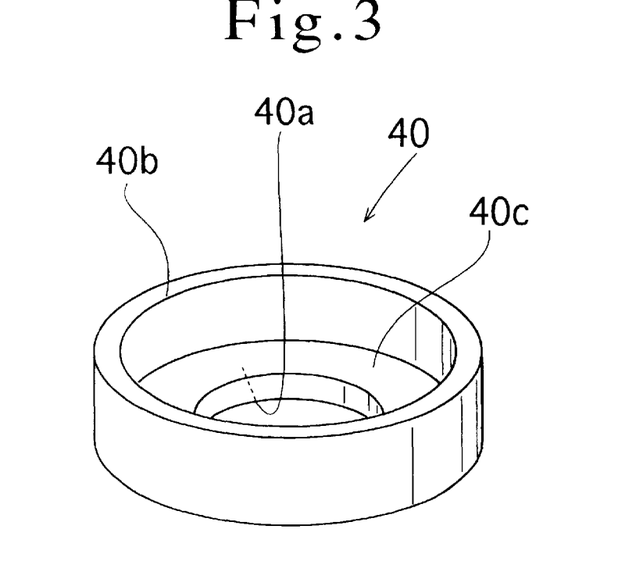
FIG. 3 is an enlarged perspective view of an engaging member in the master cylinder.

FIG. 3 shows a perspective view of the engaging member 40. It is generally cup-shaped, and consists of an annular spring receiving portion 40*a* receiving one end of the coil spring 19 and a circumferential portion 40*b* formed integrally with the spring receiving portion 40*a*, facing to the inner circumferential lip portion 32 of the cup seal 10.

As shown in FIG. 1, one end of the coil spring 19 in compression elastically contacts with the annular surface 40*a* of the engaging member 40, and another end of the coil spring 19 is supported by the closed end 3*a* of the cylindrical bore 3. The piston 5 is urged rightwards in the inoperative position as shown in FIG. 1. The fluid pressure generating chamber 7 communicates through the relief port 13 with the interior of the hydraulic reservoir. The one end of the coil spring 19 contacts with the outer circumferential surface of the axial portion 5*a* of the piston 5, at its inner circumferential surface.

Figure 2:
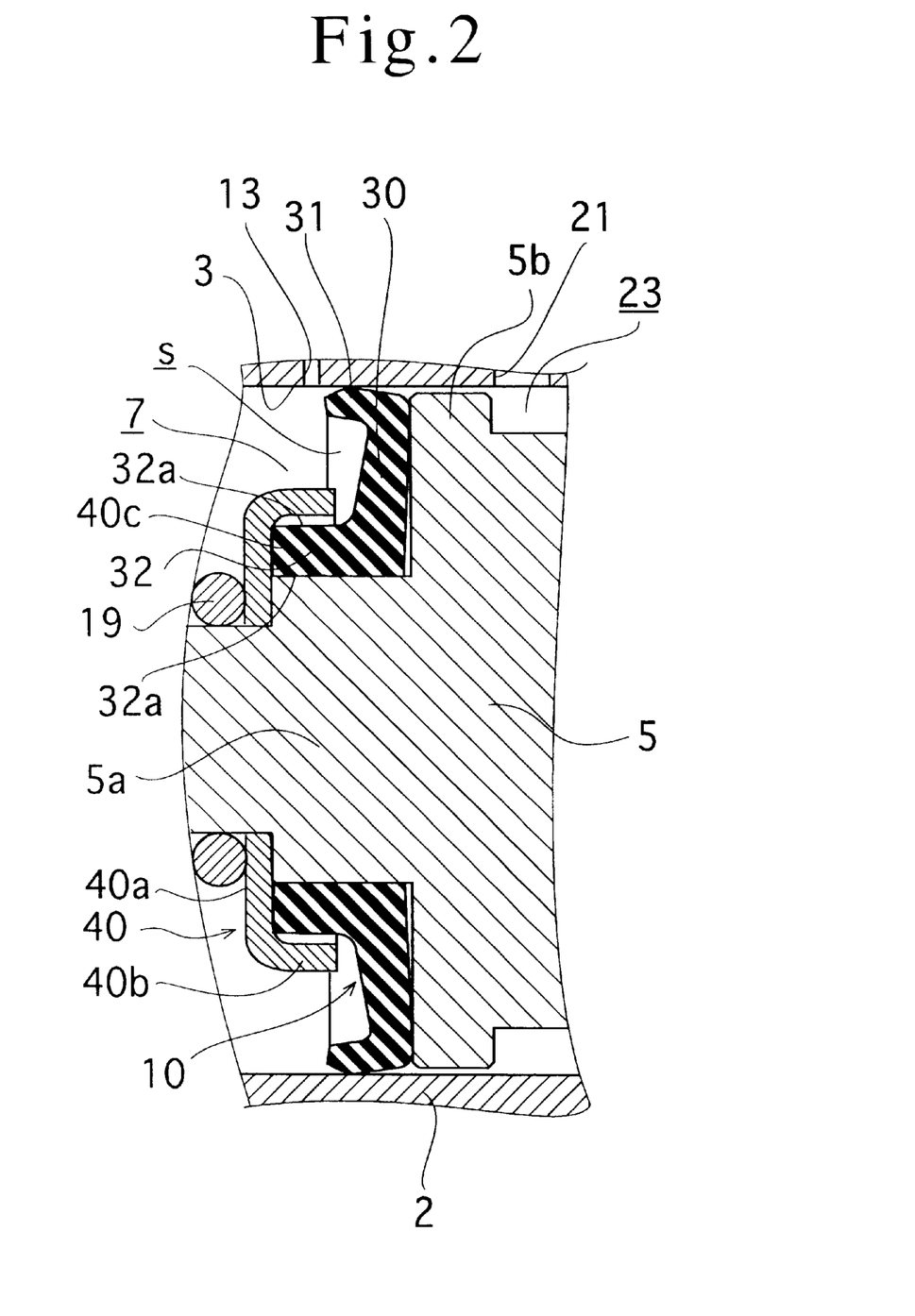
FIG. 2 is an enlarged cross-sectional view of an important part of the master cylinder.

As shown in FIG. 2, the cylindrical portion 40*b* of the engaging member 40 is put in a space <u>s</u> formed by the inner lip portion 32, the outer lip portion 31 and the base portion 30 of the cup seal 10, and thus it is fitted to the axial portion 5*a* of the piston 5. The circumferential portion 40*b* of the engaging member 40 is facing to the inner lip portion 32 of the cup seal 10, spacing small gap from each other. Thus, they are overlapped on each other. The overlapping amount of them is so much that the top end of the circumferential portion 40*b* of the engaging member 40 does not contact with the base portion 30 of the cup seal 10, and they are facing to each other at the facing area which is larger than half of an outer circumferential surface 32*a* of the inner lip portion 32 of the cup seal 10. The cup seal 10 can surely be prevented from falling out from the piston 5. An inner surface 40*c* contacts with the top end of the inner lip portion 32 to regulate the axial movement of the cup seal 10. Next, operation of the above described master cylinder 1 will be described.

The fluid-pressure generating chambers <u>6</u> and <u>7</u> communicate through the relief ports 12 and 13 with the interior of the hydraulic reservoir in which only nipple portions 16 and 17 are shown in of FIG. 1, and which is combined with boss portions 14 and 15 of the cylindrical body 2. A not-shown brake pedal is trodden to brake the wheels by the driver. The piston 4 is pushed leftwards by an output rod 35 of a not-shown booster which is received by a recess 4*b* formed in the piston 4. Also the piston 5 connected through the coil spring 18 with the piston 4 is moved leftwards. When the outer lip portions of the cup seals 8 and 10 slide beyond the relief ports 12 and 13 in the cylindrical bore 3, the fluid communication is cut between the fluid pressure generating chambers 6 and 7, and the interior of the hydraulic reservoir. With further movements of the portions 4 and 5, brake fluid pressures are generated in the fluid pressure generating chambers 6 and 7.

In this embodiment, a not-shown anti-skid fluid pressure control apparatus (ABS apparatus) is provided between the master cylinder 1 and the not-shown wheel cylinder. As well known, when the ABS apparatus is driven to prevent the wheel locking, brake fluid discharged from the wheel cylinder is pressurized and returned to the fluid pressure generating chambers 6 and 7 by a fluid pressure pump of the ABS apparatus.

When the brake pedal is relieved from trodden, the pistons 4 and 5 are moved into the inoperative positions shown in FIG. 1, with the spring forces of the coil springs 18 and 19. The fluid pressures of the fluid pressure generating chambers 6 and 7 become temporally lower than the atmosphere pressure which is equal to that of the interior of the hydraulic reservoir, with the backward movements of the pistons 4 and 5. Accordingly, the outer lip portions of the cup seals 10 and 8 are inclined or flexed inwardly as to be separated from the inner wall surface of the cylindrical bore 3. Brake fluid is flowed into the fluid pressure chambers 6 and 7 from the supply chambers 22 and 23 which are formed around the diameter-reducing portions of the pistons 4 and 5 and communicate through the supply ports 20 and 21 with the interior of the hydraulic reservoir.

There will be described the above series of operations particularly with respect to the secondary side, in more detail.

With the pedal treading, the piston 5 is moved into the operative position to compress the coil spring 19. Then, the piston 5 is slightly rotated in the winding direction of the coil spring 19. The piston 5 is slightly shifted from the original position in the peripheral direction.

When the piston 5 is moved into the operative position, and so the fluid pressure is generated in the fluid pressure chamber 7, the outer lip portion 31 is pushed outwardly with the fluid pressure and it contacts elastically with the inner wall of the cylindrical bore 3. At this time, the cylindrical portion 40b of the engaging member 40 is separated from the inner lip portion 32 and the base portion 30 by the gap. Thus, the cup seal 10 does not contact closely with the piston 5. The contact pressure between the outer lip portion 31 and the inner wall of the cylindrical bore 3 is higher than the contact pressure between the inner lip portion 32 and the outer circumferential surface of the axial portion 5a of the piston 5. Accordingly, the cup seal 10 does not follow the rotation of the piston 5. The peripheral position of the cup seal 10 does not change, but the cup seal 10 slides leftward on the inner wall of the cylindrical bore 3. Since the piston 5 is put between the coil springs 18 and 19 or nipped by them, which winding direction are equal to each other, it is rotatable on the inner wall of the cylindrical bore 3.

When the piston 5 is moved back into the inoperative position, it is rotated in the opposite to the winding direction of the coil spring 19. Thus, the rotation with the movement into the operative position is returned back in the movement into the inoperative position. As above described, the outer lip portion 31 of the cup seal 10 is inclined inwardly, and so the brake fluid is flowed into the fluid pressure generating chambers 6 and 7 through the gap between the outer circumferential surfaces and the inner wall of the cylindrical bore 3, from the supply chambers 22 and 23. Accordingly, at that time, the contact pressure between the inner lip portion 32 and the piston 5 is higher than the contact pressure between outer lip portion 31 and the inner wall surface of the bore 3. Accordingly, the cup seal 10 is rotated in the opposite to the winding direction of the coil spring 19 together with the piston 5.

These inventors made the experiment that the piston 5 was moved backwards and forwards predetermined times at room temperature. The experimental result was obtained that the cup seal 10 was rotated by 10 to 30 degrees in the same direction. When the similar experiment was made at the temperature higher than the room temperature, the rotational angle of the cup seal 10 was larger.

Such rotation of the cup seal is made with the backward movement of the piston 5, whenever the brake is applied and relieved. A position of the outer lip portion 31 which is facing to the opening of the relief port 13, changes little by little. The frequency is much reduced that the same position on the outer lip portion 31 or the base portion 30 is pushed into the opening of the relief port by the fluid pressure of the fluid pressure generating chamber 7. Thus, it can be avoided that the same position of the outer lip of the cup seal 10 is locally and concentrically damaged.

A similar rotational force is applied to the primary piston 4 wherever the coil spring is compressed and restored. However, the base portion of the cup seal 8 is nipped between the circumferential portion 25a of the engaging member 25 and the flange portion 4a of the piston 4. The contact between them is closer than the secondary side. Accordingly, the cup seal 8 is apt to rotate together with the piston 4 when the latter is moved into the operative position. It is rotated in the opposite direction when the piston 4 is moved to the inoperative position. As the result, the relative position of the cup seal 8 to the inner wall of the cylindrical bore 3 does not change in the peripheral direction.

In the master cylinder in which both the primary side and the secondary side are of the conventional type, it is proved that the outer lip portion of the cup seal 10 is more apt to be pushed into the opening of the relief port 13 by the steeply rising fluid pressure near the corresponding relief port 13 or the pulsating fluid pressure from the ABS apparatus. Accordingly, in this embodiment, the above described arrangement of the engaging member 40 and the cup seal 10 is applied only to the secondary side. When the winding directions of the coil springs 18 and 19 are equal to each other, it is proved that the piston is easier to be rotated.

Figure 4:
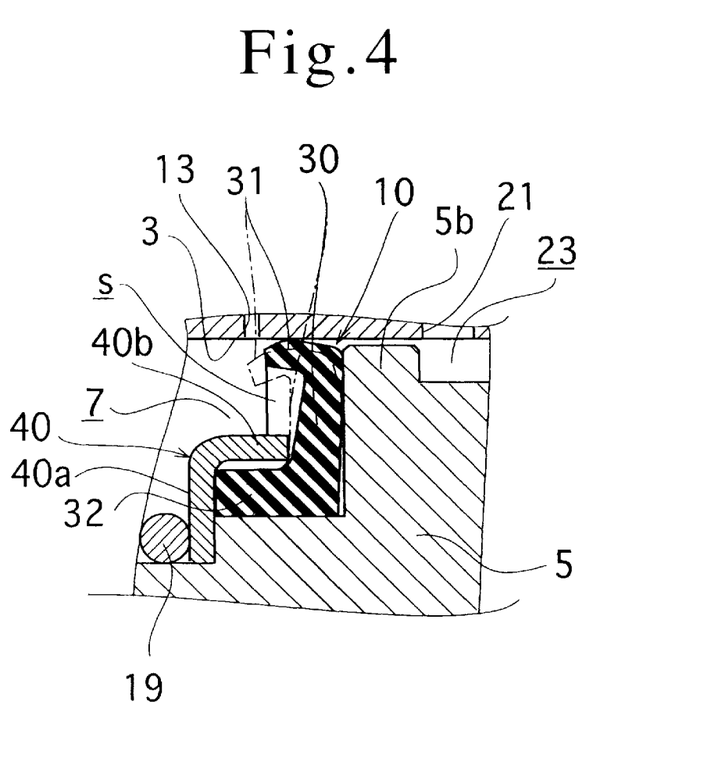
FIG. 4 is an enlarged cross-sectional view for explaining operation of the important part of a variation of an arrangement of the cup seal and engaging member.

FIG. 4 shows one variation of the above described arrangement of the cup seal 10 and the engaging member 40.

The gap between the top end of the circumferential portion 40b of the engaging member 40 and the front surface of the cup seal 10 is made smaller. When the outer lip portion 31 of the cup seal 10 is inclined as shown by the dot-dash line, with the backward movement of the piston 5, the top end of the circumferential portion 40b of the engaging member 40 contacts with the front surface of the base portion 30 of the cup seal 10. Thus, the contact pressure of the cup seal 10 to the piston 5 can be higher. Accordingly, the cup seal 10 can be more easily rotated together with the piston 5, with the backward movement of the latter.

Next, there will be described a master cylinder 1' according to a second embodiment of this invention with reference to FIG. 5.

The master cylinder 1' of this embodiment is different from the above master cylinder 1 only in cup seals 8' (not shown in FIG. 5) and 10'. The others are equal to those of the master cylinder 1. The corresponding portions are denoted by the same reference numerals.

The cup seals 8' and 10' are equal to each other in construction and operation. Accordingly, only the one 10' of them will be described hereinafter.

Figure 5:
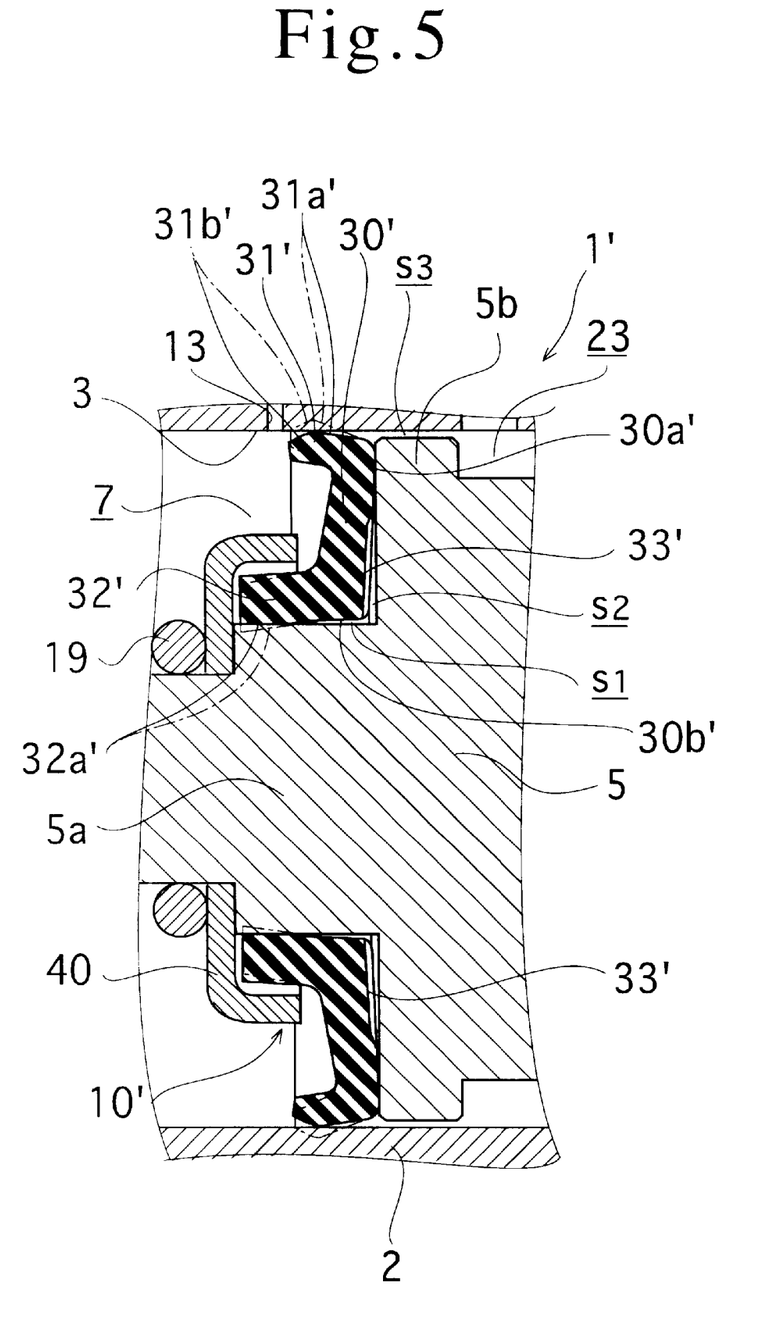
FIG. 5 is an enlarged cross-sectional view of an important part of a master cylinder according to a second embodiment of this invention.

FIG. 5 shows an enlarged cross-sectional view of a cup seal 10' fitted to the piston 5 assembled into the cylindrical body 2. In the shown condition, no fluid pressure is generated in the fluid generating chamber 7. The cup seal 10' under the free condition before assembled is shown by the dot-dash line. It consists of an outer lip portion 31' and an inner lip portion 32' both extending toward the fluid pressure generating chamber 7 and a base portion connecting integrally the outer and inner lip portions 31' and 32'.

An outer circumferential surface of the outer lip portion 31' consists of a first inclined surface 31a' extending outwardly and continuously from the circumferential surface of the base portion 30', and a second inclined surface 31b' extending inwardly and continuously from the first inclined surface 31a'. In the assembled condition as shown in FIG. 5, the outer lip portion 31' is elastically deformed inwardly, and so the boundary portion between the first and second inclined surfaces 31a' and 31b' are pushed elastically in contact with the inner wall of the cylindrical bore 3 at the strongest force.

The inner diameter of the base portion 30' is larger than the diameter of the axial portion 5a of the piston 5. An inner circumferential surface 30b' of the base portion 30' is facing to the outer circumferential surface of the axial portion 52, spaced from each other by a gap, which is, for example, equal to 0.1 to 0.2 mm.

The inner circumferential surface 32a' of the inner lip portion 32' is so formed as to be bent inwardly from the inner circumferential surface 30b' of the base portion 30'. In the shown assembled condition, the inner lip portion 32' is elastically deformed outwardly, and the top end portion of the inner circumferential surface 32a' is pressed onto the outer circumferential surface of the axial portion 5a of the piston 5.

Figure 6:
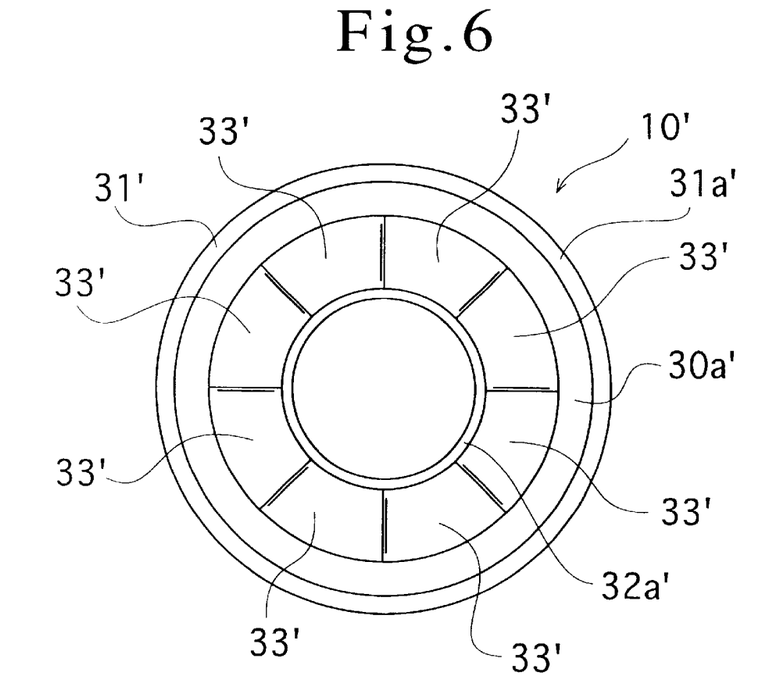
FIG. 6 is a plain view of the cup seal shown in FIG. 5.
Figure 7:
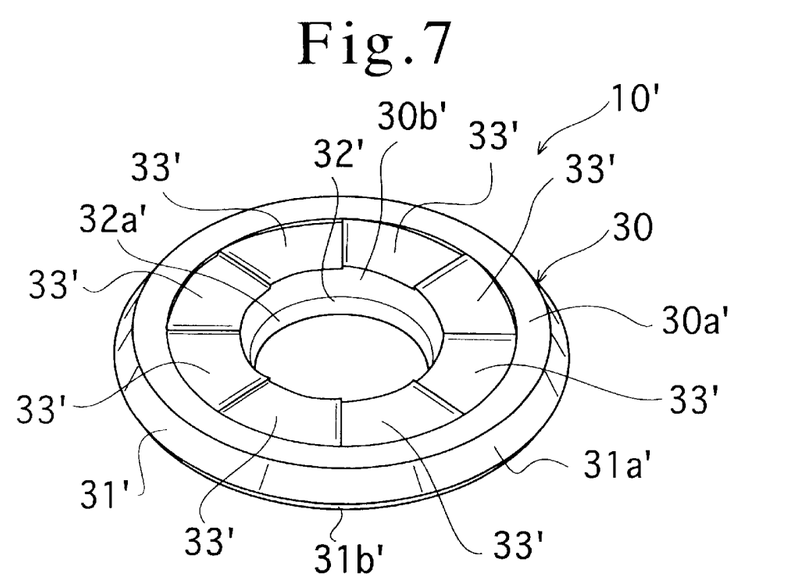
FIG. 7 is an enlarged perspective view of a cup seal of FIG. 6.

FIG. 6 shows a back side view of the cup seal 10'. FIG. 7 shows a perspective view of the back of the cup seal 10'. An annular surface 30a' is formed at the outer end of the back of the cup seal 30. Eight propeller blades 33' are stepwisely and circularly formed inside of the annular surface 30a', and inclined to the front side of the cup seal 10', in the clockwise direction. They function as assisting means for inducing rotation of the cup seal 10'. They are inclined into the depth which is equal to about one eighth to one sixth of the thickness of the base portion 30' in the axial direction. Further, the inner portion of the back of the base portion 30' is so tapered as to separate gradually from the flange portion 5b of the piston 5, as shown in FIG. 5. The tapered portion functions as assisting means for promoting the rotation of the cup seal 10'. In the inoperative position as shown in FIG. 5, a gap s2 is formed between the flange portion 5b of the piston 5 and the back surface of the base potion 30' including the propeller blades 33. Only the annular surface 30a' contacts with the flange portion 5b of the piston 5.

With the return movement of the piston 5, the pressure of the fluid pressure generating chamber 7 become lower than that of the supply chamber 23'. Accordingly, the outer lip portion 31' of the cup seal 10' is separated from the inner wall of the cylinder bore 3 and then inclined inwardly toward the center of the cylinder bore 3. The brake fluid is flowed through the gap s3 between the flange portion 5b of the piston 5 and the inner wall of the cylinder bore 3, and the gap between the deformed outer lip portion 31' and the inner wall of the cylinder bore 3, into the fluid pressure generating chamber 7 from the supply chamber 23. A gap is formed between the annular surface 30a' and the flange portion 5b of the piston 5, with the inward inclination of the outer lip portion 31'. Accordingly, a part of the brake fluid from the supply chamber 23 is flowed on the propeller-blades 33 of the cup seal 10. The flow of the brake fluid on the propeller-blades 33 generates rotational force to the cup seal 10.

At that time, there is the gap s1, between the inner circumferential surface 30b' of the base portion 30' and the outer circumferential surface of the axial position 5b of the piston 5, and further the gap s2 which has been reduced to zero with the fluid pressure of the fluid pressure generating chamber 7, is again made between the flange portion 5b of the piston 5 and the back side of the cup seal 10. The contact area (contact pressure) is reduced between the cup seal 10 and the piston 5. Accordingly, the cup seal 10 can be easily rotated relative to the flange portion 5b of the piston 5 with flow action onto the propeller-blades 33.

Whenever the piston 5 is returned to the inoperative position, the position of the circumferential surface of the cup seal 10 to be facing to the opening of the relief port 13 gradually changes. Accordingly, it can be avoided that the same position of the circumferential surface of the cup seal 10 is pushed into the opening of the relief port 13 with the fluid pressure of the fluid pressure generating chamber 7, whenever the brake is applied. The concentric damage to the cup seal 10 can thus be prevented.

Figure 8A:
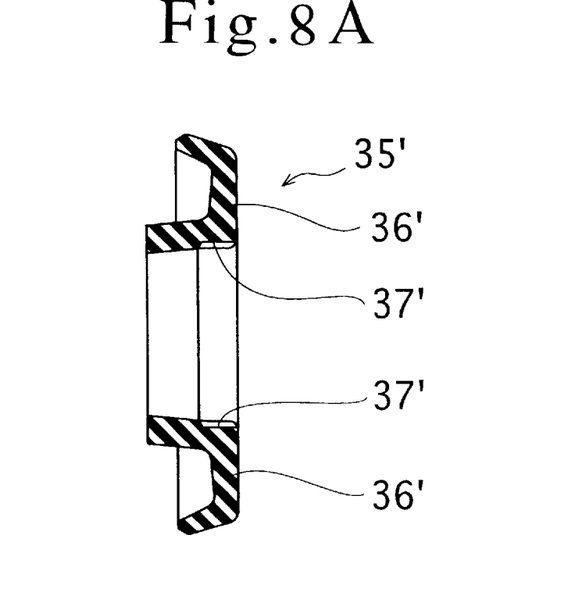
FIG. 8A is an enlarged cross-sectional view of a cup seal according to a third embodiment of this invention.
Figure 8B:
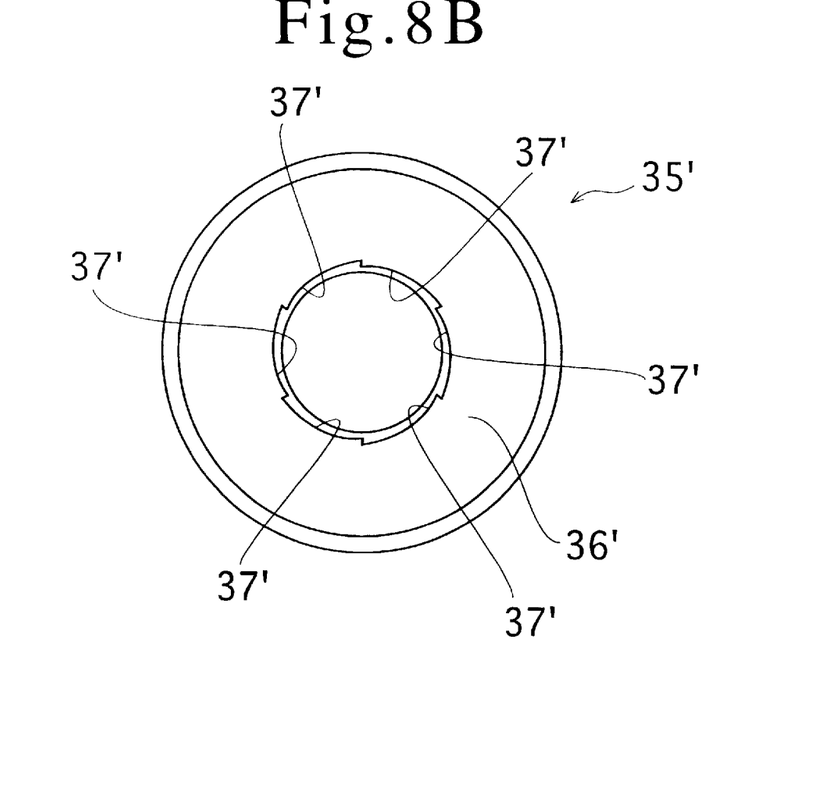
FIG. 8B is a side view of the cup seal of FIG. 8A.

FIG. 8 shows a cup seal 35' according to a third embodiment of this invention.

Figure 9A:
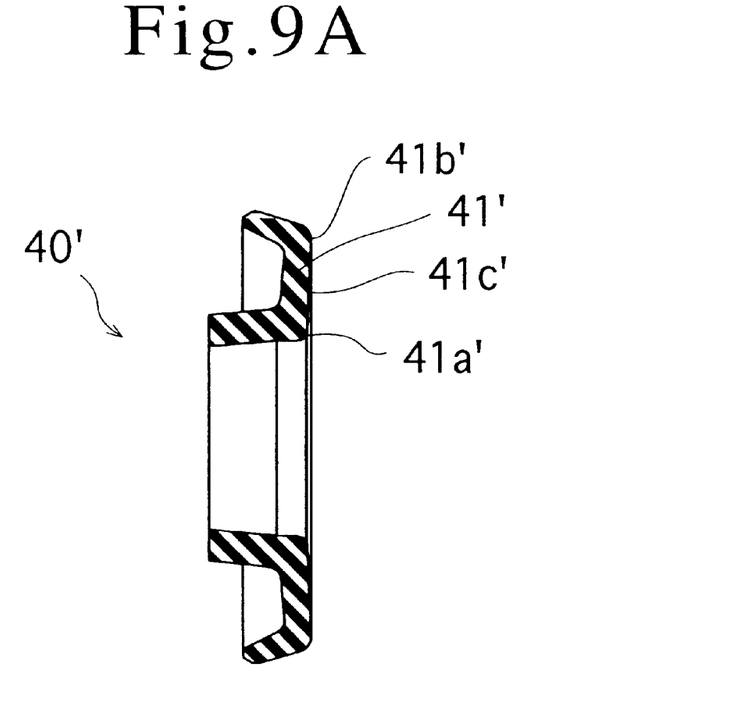
FIG. 9A is an enlarged cross-sectional view of a cup seal according to a fourth embodiment of this invention.
Figure 9B:
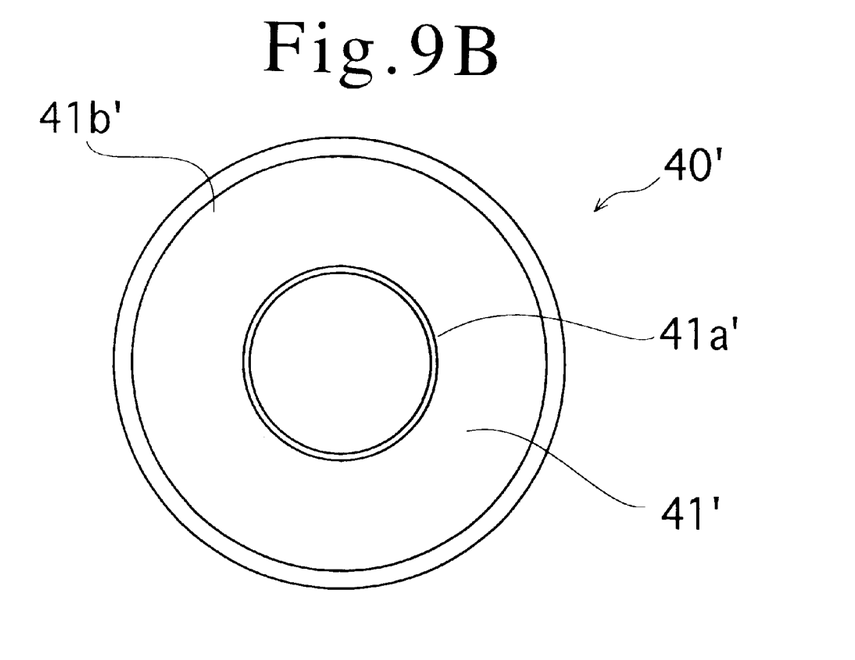
FIG. 9B is a side view of the cup seal of FIG. 9A.

FIG. 8A is a cross-sectional view of the cup seal 35' and FIG. 9B is a back side view of the cup seal 35'. Instead of the above cup seal 10', the cup seal 35' is fitted to the piston 5 in FIG. 5.

In the above embodiment, the propeller-blades 33' are formed as assisting means for inducing rotational force, on the back surface of the cup seal 10'. In this embodiment, the assisting means is forming on an inner circumferential surface of a base portion 36' of the cup seal 35'.

As shown in FIG. 8B, plural (six) triangular recesses 37' is formed on the inner circumferential surface of the base portion 36 of the cup seal 35'. The recesses 37' are so tapered that the gap between the inner circumferential surface of the base portion 36 and the outer circumferential surface of this axial portion 5a of the piston 5 is increased in the clockwise direction in FIG. 8B. The recesses 37' are stepwisely formed in the clockwise direction. The smallest inner diameter of the inner circumferential surface of the base portion 36', in which the triangular recesses 37' are formed, is so large that the gap s1 is formed as in the above embodiment.

With the return movement of the piston 5, a part of the brake fluid from the supply chamber 23 is flowed into the gap between the back of the base portion 36' and the flange portion 5b of the piston 5, and into the recesses 37'. It is applied to the slants of the recesses 37' to impart rotational force to the cup seal 35'. A gap is formed between the inner circumferential surface of the base portion 36' and the outer circumferential surface of the axial portion 5a of the piston 5. The contact surface between the cup seal 35' and the flange portion 5b of the piston 5 is reduced. Accordingly, the cup seal 35' can be easily rotated relative to the flange portions 5b of the piston 5. The portion of the peripheral surface facing to the opening of the relief port 13 changes gradually.

Next, there will be described a cup seal 40' according to the fourth embodiment of this invention.

FIG. 9A is a cross-sectional view of the cup seal 40' under the free condition before assembled, and FIG. 9B is a back side view of the cup seal 40'. It is fitted to the piston 5 shown in FIG. 5, instead of the cup seal 10'.

The inner diameter of the base portion 41' of the cup seal 40' is larger than the diameter of the axial portion 5a of the piston 5 to form a gap between them.

The back surface 41c' of the cup seal 40' is tapered from the outer side 41b' toward the inner side 41a' so as to be gradually separated from the flange portion 5b of the piston 5. Thus, a low conical gap is formed between the back surface 41c' of the base portion 41' and the flange portion 5b of the piston 5. The contact surface between the piston 5 and the cup seal 40 is so reduced.

One compensating port 21 is formed on the wall of the cylindrical bore facing to the annular compensating or supply chamber 23. Accordingly, brake fluid from the supply chamber 23 is not always uniformly flowed toward the back surface 41c' of the cup seal 41'. Generally, the brake fluid is flowed one-sidely towards the back surface 41' of the cup seal 40'. Thus, rotational force is generated. As above described, the contact pressure between the piston 5 and the cup seal 40' is reduced. The cup seal 40' is apt to rotate. It is rotated by the one-sided flow of the brake fluid to the back surface 41c'. The position facing to the opening of the relief port 13 changes in the outer circumferential surface of the cup seal 40'.

Figure 10A:
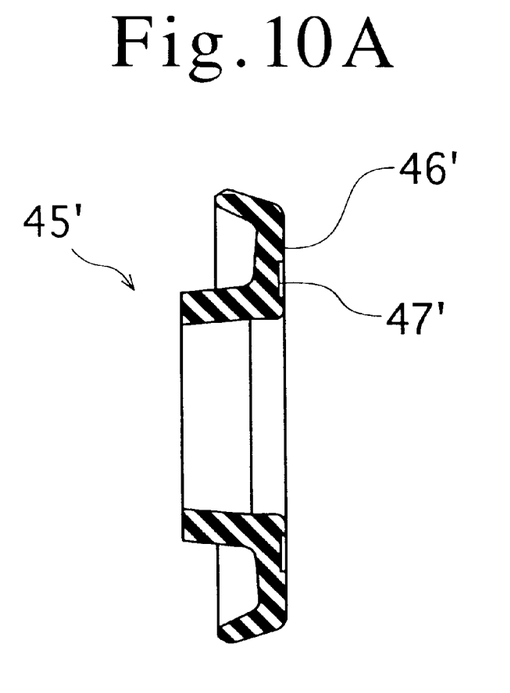
FIG. 10A is an enlarged cross-sectional view of a cup seal according to a fifth embodiment of this invention.
Figure 10B:
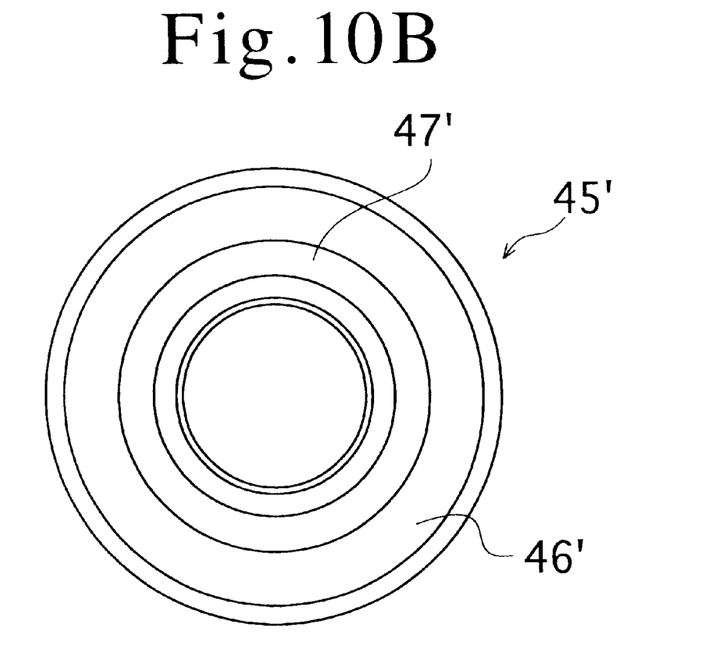
FIG. 10B is a side view of the cup seal of FIG. 10A.

FIG. 10 shows a cup seal 45' according to the fifth embodiment of this invention. An annular groove 47' is formed one-sidely toward the center in the back surface 46' of the cup seal 45' to reduce the contact surface between the cup seal 45' and the piston 5, and to promote the rotation. The inner diameter of the base portion 46' is larger than the diameter of the axial portion 5a of the piston 5. The depth of the annular groove 47' is equal to about one eighth to one sixth of the thickness of the base portion 46' in the axial direction. With the return movement of the piston 5, the contact surface can be sufficiently reduced.

The rotational forces of the cup seals in the fourth and fifth embodiments are not so large as those of the cup seals in the second and third embodiments. However, the position facing to the opening pf the relief port can be sufficiently changed also in the fourth and fifth embodiments.

It is preferable that the above described cup seals are made of ethylene-propylene co polymerization rubber (EPDM), hardness of 75 to 85 Hs, 100% modulus, more than 10MPa. Aging deterioration in material can be much reduced. Since the hardness is so high and elastic limit can be increased, it is hard to be pushed into the relief port. Even when it is pushed into the relief port, it can be elastically restored. The damage of the cup seal can be effectively prevented. The life of the master cylinder itself can be more prolonged. "100% modulus" means the tensile stress of rubber material when extended 100% (to the double length).

Preferably, a cup seal is manufactured by an injection molding method, using two dies. After molding, the two dies are separated from each other in the axial direction (refer to FIG. 1). The cup seal directly after molded is at the higher temperature than 180° C. Mechanical strength of such hot cup seal is low. It is apt to be cracked. Accordingly, it should be so carefully taken out from the dies as not to be cracked. Particular care is needed for the cup seal of high hardness and high modulus. The cup seal described in the "Description of the Prior Art", in which the slant grooves for inducing rotation are formed in the outer circumferential surface of the base portion, is difficult to be released from the dies, since the slant grooves are slanted with respect to the axial direction which is the releasing direction. The cup seals according to the embodiments of this invention are not so shaped as to prevent release of the dies. The releasing of the cup seals is good. They are not stressed, when they are released. The cracks can be prevented to occur in the cup seals.

Recesses, grooves or inclined surfaces are formed in the back of the base portions of the cup seals. Accordingly, the surfaces vertical to the axial direction are generally not flat. Accordingly, when the cup seals are transported by a vibrational machine such as a parts-feeder, in the automatic assembling process, the cap seals can be prevented from being sucked on the transport surface, and then can be supplied smoothly to the next step. Thus, the automatic assembling can be easily effected.

While the preferred embodiments have been described, variations thereto will occur to those skilled in the art within the scope of the present inventive concepts which are delineated by the following claims.

For example, the back of the base portion is inclined in the second embodiment. However, without inclination, the propeller-blades 33 may be formed. The number of the blades 33 is not limited to eight, but may be, for example, four.

Further, a shape of a cup seal is not limited to the shapes of the above cup seals. It may be shaped as a combination of the shapes according to the third and fourth embodiments, or may be shaped as a combination of the shapes according to the third and fifth embodiments.

Further, in the first embodiment, the cylindrical portion 40b of the engaging member 40 facing to the inner lip portion 32 is continuously formed integrally 5 with the spring-receiving portion 40a. It may be divided into plural pieces. At this case, they should be arranged at the regular intervals so that they might not contact with the inner lip portion with the fluid pressure in the operative movement of the piston 5.

What is claimed is:

1. In a master cylinder including:
   (a) a cylinder body having a cylindrical bore and an opening provided through a circumferential wall of the cylinder body for a relief port in the bore communicating with the interior of a hydraulic reservoir:
   (b) a piston slidably inserted into said cylindrical bore to thereby form a hydraulic pressure generating chamber in said cylindrical bore;
   (c) an annular cup seal having an inner circumferential lip portion contacting with said piston, an outer circumferential lip portion slidably contacting with an inner circumferential wail of said cylindrical bore, and a base portion connecting said lip portions, said lip portions so arranged as to face to said hydraulic pressure generating chamber and said opening, whereby said cup seal is positioned to cut communication between said hydraulic pressure generating chamber and said hydraulic reservoir through said relief port when portions of said outer circumferential lip pass by said opening; and
   (d) the improvement comprising two coil springs in tandem urging said piston into its inoperative position, with the winding directions being equal to each other; and an engaging member having a spring receiving portion engaged with either of said coil springs and an inner surface contacting with a top end of said inner circumferential lip portion of said cup seal and having a circumferential portion protruding into a space formed by said inner circumferential lip portion, said outer circumferential lip portion and said base portion without contact with said inner circumferential lip; said outer circumferential lip and said base portions, and said cup seal sliding in said cylindrical bore without rotation, whereby the contact pressure between said outer circumferential lip portion and said inner circumferential wall of said cylindrical bore is larger than the contact pressure between said inner circumferential lip portion and said piston, when said piston moves in its operative direction to seal said opening; and said cup seal sliding in said cylindrical bore with rotation together with said piston, whereby the contact pressure between said inner circumferential lip portion and said piston is larger than the contact pressure between said outer circumferential lip portion and said inner wall of said cylindrical bore, when said piston moves in said inoperative direction to unseal said opening.

2. A master cylinder according to claim 1, in which said piston rotates in said winding direction of said coil springs when said piston moves into said operative direction to compress said coil springs, and said piston rotates in an opposite direction to said winding direction of said coil springs when said piston moves into said inoperative direction due to a restoring force of said coil springs.

3. A master cylinder according to claim 1, in which said circumferential portion of said engaging member overlaps said inner circumferential lip portion by more than half of its inner exposed surface area.

4. A master cylinder according to claim 1, in which there is a desired gap between said circumferential portion of said engaging member and said base portion in the inoperative position of said piston, said gap dimensioned whereby when said piston is moved back from the operative position to the inoperative position the hydraulic pressure of said hydraulic pressure generating chamber becomes lower than atmosphere pressure to thereby incline said outer circumferential lip portion and decrease said desired gap.

5. A master cylinder according to claim 1, in which an annular series of propeller-blade-like surfaces are provided in inclination to the axis of said cup seal on a back face of said base portion facing said piston and in the radial direction of said cup seal.

6. In a master cylinder including:
(a) a cylinder body having a cylindrical bore and an opening in a circumferential wall portion of said body for a relief port in the bore communicating with the interior of a hydraulic reservoir;
(b) a piston slidably inserted into said cylindrical bore to thereby form a hydraulic pressure generating chamber in said cylindrical bore;
(c) an annular cup seal having a base portion with front and back sides and supported at the back side by a flange portion of said piston, and an outer circumferential lip portion extending towards said hydraulic pressure generating chamber from the front side of said base portion and contacting with the cylindrical bore whereby said cup seal cuts the communication between said hydraulic pressure generating chamber and said hydraulic reservoir through said relief port when portions of said outer circumferential lip pass by said opening; and
(d) the improvement comprising an inner diameter of said base portion dimensioned sufficiently large such that a gap is formed between an inner circumferential surface of said base portion and an outer circumferential surface of an axial portion of said piston fitting to said base portion, and means for inducing rotational force to said cup seal relative to said cylindrical bore with the relief of fluid pressure in the generating chamber or with reduction of contact pressure on said piston to thereby cause said cup seal to rotate, said means provided on said back side and/or said inner circumferential surface of said base portion.

7. A master-cylinder according to claim 6, in which said means for inducing is propeller-blade-like surfaces formed in the back side of said base portion along its periphery and inclined to the axial direction of said cup seal.

8. A master cylinder according to claim 7, in which said propeller-blade-like surfaces are formed as recesses in the back side and they face said flange portion of the piston and are spaced by a gap from each other.

9. A master cylinder according to claim 6, in which said means are triangular recesses formed in said inner circumferential surface of said base portion and spaced by gaps from an outer circumferential surface of an axial portion of said piston.

10. A master cylinder according to claim 6, in which said means is a taper formed on the back side of said base portion so as to be separated from said flange portion of the piston.

11. A master cylinder according to claim 6, in which said means for inducing is a groove formed off center in the back side of said base portion.

12. A master cylinder according to claim 6, in which said cup seal is ethylene-propylene co-polymer rubber (EPDM) with a hardness of 73 to 85 Hs, and a higher-than-10 Mpa tensile stress when extended to the double length.

* * * * *